United States Patent [19]
Sanders

[11] Patent Number: 5,210,396
[45] Date of Patent: May 11, 1993

[54] BABY WIPE WARMER APPARATUS

[76] Inventor: Ronald L. Sanders, 1524 E. Orman Ave., Pueblo, Colo. 81004

[21] Appl. No.: 877,652

[22] Filed: May 1, 1992

[51] Int. Cl.⁵ .............................................. H05B 3/36
[52] U.S. Cl. .................................. 219/521; 219/386; 219/535
[58] Field of Search ............... 219/385, 386, 387, 521, 219/535

[56] References Cited

U.S. PATENT DOCUMENTS

| | | | |
|---|---|---|---|
| 3,619,563 | 11/1971 | Hirst | 219/386 |
| 4,694,973 | 9/1987 | Rose | 219/521 |
| 4,810,859 | 3/1989 | Anabtawi | 219/535 |

FOREIGN PATENT DOCUMENTS 279883 12/1951 Switzerland ........................ 219/521

Primary Examiner—Teresa J. Walberg
Attorney, Agent, or Firm—Phillip A. Rein

[57] ABSTRACT

A baby wipe warmer apparatus to receive a baby wipe box therein to heat baby wipes and includes a wipe container assembly having a container heater assembly. The wipe container assembly includes a container body member with a container lid member pivotally connected thereto. The container heater assembly heats all sides of the baby wipe box. The container lid member has connector members whereupon it can be sealed to the container body member through zipper members or Velcro fasteners. The main lid body has a central dispenser opening which can be closed by Velcro fasteners or open to allow dispensing of baby wipes therethrough.

15 Claims, 1 Drawing Sheet

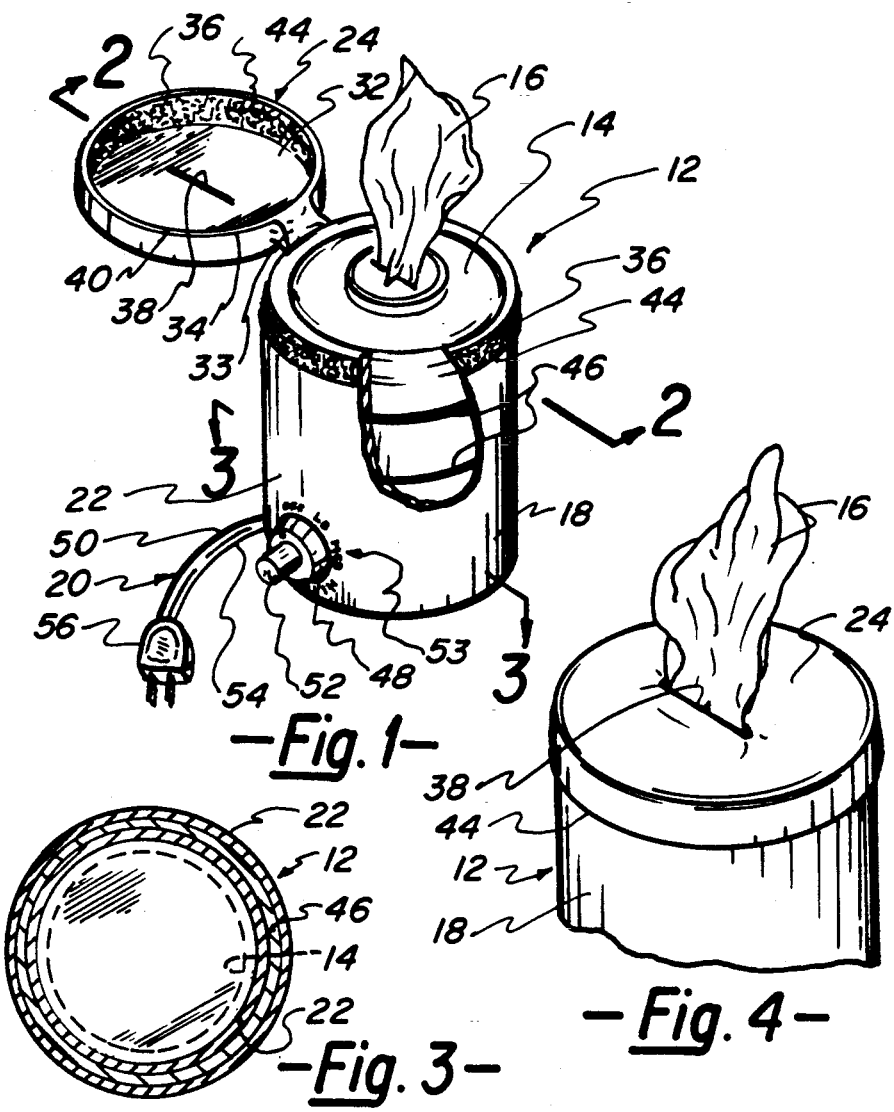
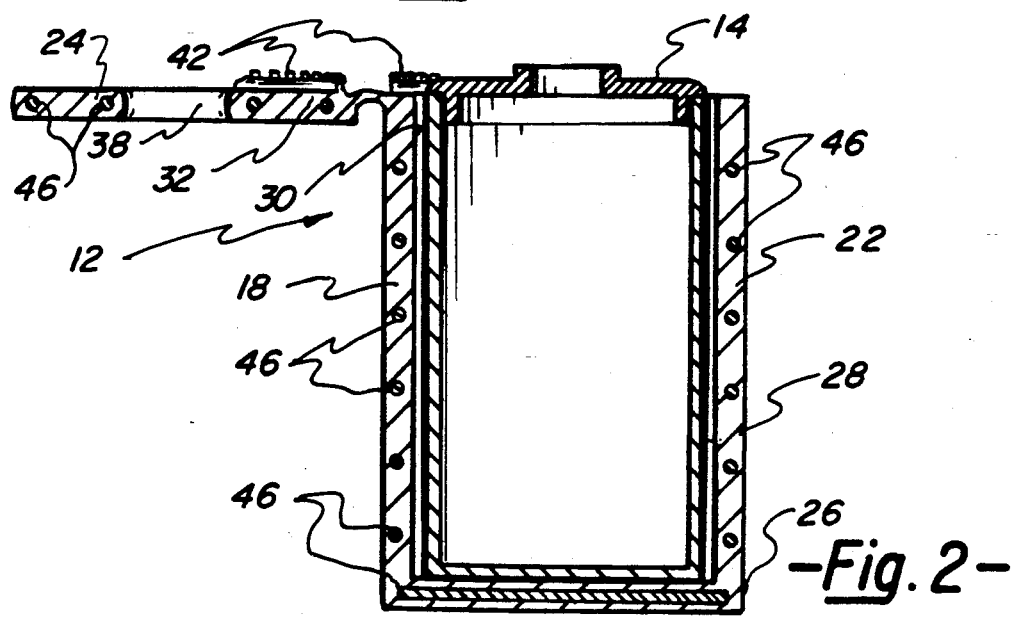

BABY WIPE WARMER APPARATUS

A patent search was conducted on this invention and revealed the following U.S. Pat. Nos.:

| Patent No. | Invention | Inventor |
|---|---|---|
| 2,079,611 | BABY'S NURSING BOTTLE HEATER | Alexander T. Harvey |
| 3,105,138 | BATTERY POWERED HEATER FOR CONSERVES | Frank Gazdik |
| 4,421,973 | ELECTRIC TOOTH PASTE TUBE WARMER | Kwong-Li Lou |
| 4,694,973 | WARMING DEVICE FOR DISPOSABLE TOWEL DISPENSER | Rose et al |
| 4,700,048 | HEATING ATTACHMENT FOR TOWELETTES | Nathan Levy |
| 4,890,205 | COMBINED NIGHT LIGHT AND PRE-MOISTENED TOWELLETTE WARMER | Dennis E. Shaffer |
| 4,912,303 | ELECTRIC HEATING BELT FOR LIQUID PROPANE BOTTLES | Beavers et al |
| 4,943,705 | TISSUE WARMING APPARATUS | Michael R. Halloran |
| 4,947,026 | TOWEL HEATING AND MOISTENING | Groom et al |
| 5,036,178 | HEATER UNIT FOR HEATING CONTAINER FOR MOIST TISSUES | Israel Orbach |

The Harvey patent discloses a baby's nursing bottle heater which presents an open container and having heating members therein extended up the side walls of the container.

The Gazdik patent discloses a flashlight type battery powered heater having a heat plate.

The Lou patent discloses an electric tooth paste tube warmer which teaches the use of the electrical heating elements about a top connector member and heating an entrance area.

The Rose et al, Levy, and Shaffer patents disclose warming devices utilizing a light bulb as a heat source to heat towelettes or pre-wetted disposable towels before dispensinq therefrom.

The Beavers et al patent discloses an electric heating belt which can be wrapped around a structure.

The Halloran and Orbach patents disclose tissue warming apparatus for warming body wipes used on infants.

The Groom et al patent discloses a towel heating and moistening assembly.

PREFERRED EMBODIMENT OF THE INVENTION

In one preferred embodiment of this invention, a baby wipe warmer apparatus is provided adapted to receive a baby wipe box therein having baby wipes to be selectively dispensed therefrom. The baby wipe warmer apparatus is operable to maintain a selected predetermined temperature therein to heat the baby wipes before usage on an infant for maintenance purposes.

The baby wipe warmer apparatus includes a wipe container assembly having a container heater assembly connected thereto. The wipe container assembly includes a container body member with a central cavity to receive the baby wipe box therein and having a container lid member pivotally connected to an upper edge of the container body member.

The container body member includes a bottom wall having an upright integral side wall of cylindrical shape. An upper end of the side wall defines an entrance opening to receive the baby wipe box therein.

The container lid member includes a main lid body secured by a connector portion to the side wall of the container body member. Further, the container lid member includes an anchor section mounted about an outer periphery of the main lid body having a connector member thereon. A dispenser opening is provided in a central portion of the main lid body so that baby wipes can be selectively dispensed therethrough.

The peripheral anchor section may be constructed of elastic material so as to fit about and be connected in a sealing manner to an upper edge of the side wall of the container body member.

The connector member can be a zipper member which can interconnect the adjacent outer periphery of the side wall and the peripheral anchor section.

In another embodiment, the anchor member could be Velcro fasteners to releasably connect the container lid member about the container body member. Also, the dispenser opening can be secured in a closed condition as by Velcro fasteners.

The container heater assembly includes integral heater coil elements connected to a thermostat member and then to a power supply member. The heater coil elements can be horizontally or vertically mounted within the container body member. Further, the heater coil elements are mounted within the container lid member and the bottom wall to provide a heat supply source on all sides of the baby wipe box contained therein.

The thermostat member has a control knob and control indicia so that the control knob can be rotated to set a predetermined constant temperature such as low, medium, high or any selected temperature therebetween.

The thermostat member would operate in a conventional manner so as to energize the heater coil element as necessary to maintain a chosen pre-selected temperature as noted by the control indicia.

The power supply member includes an electrical cord having one end connected through the thermostat member to the heater coil elements and, on an opposite end, provided with an electrical plug operable to be placed in a conventional 110 volt AC power supply receptacle. The container heater assembly could operate on 12 volt DC and be connected to a cigarette lighter receptacle in a motor vehicle.

OBJECTS OF THE INVENTION

One object of this invention is to provide a baby wipe warmer apparatus operable to receive a baby wipe box with baby wipes therein in order to maintain the moisturized baby wipes at a predetermined selected temperature.

Another object of this invention is to provide a baby wipe warmer apparatus having a container body member with a container lid member mounted thereon operable to receive and enclose a baby wipe box in order to heat baby wipes therein before dispensing through a dispenser opening in the container lid member.

One other object of this invention is to provide a baby wipe warmer apparatus including a wipe container assembly with a container heater assembly connected thereto in order to heat a bottom wall, side wall, and a container lid member to provide a maximum efficiency in heating of baby wipes contained within a baby wipe box mounted within the wipe container assembly.

One further object of this invention is to provide a baby wipe warmer apparatus having a container heater assembly mounted within a wipe container assembly and provided with a thermostat member with a control knob to maintain a pre-selected constant temperature to baby wipes mounted therein.

Still, one further object of this invention is to provide a baby wipe warmer apparatus operable to receive a baby wipe box therein to heat baby wipes prior to dispensing therefrom and being economical to manufacture; energy efficient in maintaining a pre-selected heated condition; having means for securely holding a container lid member in a sealed condition; having a dispenser opening in the container lid member to prevent heat loss therefrom; and being substantially maintenance free.

Various other object, advantages, and features of the invention will become apparent to those skilled in the art from the following discussion, taken in conjunction with the accompanying drawings, in which:

FIGURES OF THE INVENTION

FIG. 1 is a perspective view of the baby wipe warmer apparatus of this invention having a baby wipe box containing baby wipes to be dispensed therefrom mounted therein;

FIG. 2 is a enlarged sectional view taken along line 2—2 in FIG. 1;

FIG. 3 is a sectional view taken along line 3—3 in FIG. 1; and

FIG. 4 is a fragmentary perspective view of an upper portion of the baby wipe warmer apparatus having a baby wipe being in position to be dispensed therefrom.

The following is a discussion and description of preferred specific embodiments of the baby wipe warmer apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a baby wipe warmer apparatus of this invention, indicated generally at 12, is operable to receive a baby wipe box 14 therein for selective dispensing of baby wipes 16 therefrom.

It is desirable to maintain the moisturized baby wipes 16 at a constant heated condition, such as 100 degrees, as they contain a liquid therein for ease in providing maintenance on an infant. It is preferred that the baby wipes 16 are warm and not cold which tends to shock the subject infant being maintained.

The baby wipe warmer apparatus 12 is operable to provide an energy efficient means of enclosing the baby wipe box 14 and maintaining a constant temperature to the baby wipes 16 being dispensed therefrom. Means are provided so that temperature of the baby wipes 16 can be pre-selected and maintained constant as will be explained.

The baby wipe warmer apparatus 12 includes a wipe container assembly 18 having a container heater assembly or heating means 20 connected thereto. The wipe container assembly 18 includes a container body member 22 having a container lid member 24 releasably and/or pivotally connected to the container body member 22.

The container body member 22 is of a generaly can shape having a bottom wall 26 integral with an upright side wall 28 of cylindrical shape. The upper edge of the side wall 28 defines an entrance opening 30 operable to snugly receive the baby wipe box 14 therein as noted in FIG. 1.

The container lid member 24 includes a main lid body 32 connected through a connector portion 33 to an adjacent side of the side wall 28 of the container body member 22.

The container lid member 24 further includes a peripheral anchor section 34 which can be releasably connected by a connector member 36 to an adjacent portion of an upper end of the side wall 28 of the container body member 22.

The peripheral anchor section 34 may have an elastic portion 40 which is operable to be snugly fit about an upper, outer portion of the side wall 28.

The connector member 36 can be a zipper member 42 as noted in FIG. 2 so as to provide a sturdy, air-tight connection at the zipper member 42 to prevent heat loss therefrom. Also, the connector member 36 could be Velcro fasteners 44 as noted in FIG. 1 which, again, would provide a releasable but air-tight type interconnection between the container lid member 24 and the container body member 22 as noted in the sealed condition of FIG. 4.

The main lid body 32 is provided with a dispenser opening or slit 38 in the main lid body 32 which can be held in a closed position as by Velcro fasteners 44. This allows for the dispensing of a baby wipe 16 through the dispenser opening 38 as noted in FIG. 4.

The container heater assembly 20 includes integral heater coil elements 46 mounted within the container body member 22 and the container lid member 24. The heater coil elements 46 are connected to a thermostat member 48 which, in turn, is connected to a power supply member 50. The heater coil elements 46 are mounted within the bottom wall 26, side wall 28, and the main lid body 32 as noted in FIG. 2. The heater coil elements 46 are mounted through the connector portion 33 to the main lid body 32.

The thermostat member 48 has a control knob 52 which is rotatable to select a constant desired heat temperature as noted by the control indicia 53 being "LO" for Low, "MED" for Medium, "HI" for High, and "OFF" for Off. The thermostat member 48 is rotatable in a conventional manner to pre-select the temperature to be reached and maintained within the wipe container assembly 18 in a manner to be explained.

The power supply member 50 includes a conventional elecrical cord member 54 having one end connected to the thermostat member 48 and the other end connected to an electrical plug 56 which is two prong style to be mounted in conventional electrical receptacles to provide a 110 volt AC power source.

USE AND OPERATION OF THE INVENTION

In the use and operation of the invention, the baby wipe warmer apparatus 12 has a central cavity within the container body member 22 which could be of circular, square, or rectangular shape but is operable to snugly receive the baby wipe box 14 therein as noted in FIG. 1.

The baby wipe box 14 is initially placed therein with the container lid member 24 in the open condition. The container lid member 24 can then be pivoted about the connector portion 33 to achieve the sealed and closed condition as noted in FIG. 4. It is noted that the connector member 36 can be a zipper member 42 or the use of the elastic peripheral anchor section 34 and held in a closed condition as by Velcro fasteners 44.

The central dispenser opening 38 in the main lid body 32 can be held in an enclosed energy saving condition through overlapping Velcro fasteners 44.

The container heater assembly 20 is operable on rotation of the control knob 52 of the thermostat member 48 to achieve a desired temperature, such as "MED" for Medium, which may maintain the baby wipes 16 at a desired temperature such as 100 degrees F. It is obvious that the control knob 52 can be rotated as required to maintain the desired heat within the baby wipe box 14 and the moisturized baby wipes 16.

It is seen that the baby wipe warmer apparatus 12 can be constructed of various materials and having an outer insulation covering so as to minimize heat loss therefrom and to direct the heat generated by the heater coil elements 46 inwardly towards the baby wipe box 14 and moisturized baby wipes 16 for efficient and effective heating thereof.

The baby wipe warmer apparatus of this invention is economical to manufacture; easy to use; requiring a minimum amount of energy for heating of the baby wipes; and substantially maintenance free.

While the invention has been described in conjunction with preferred specific embodiments thereof, it will be understood this description is intended to illustrate and not to limit the scope of the invention, which is defined by the following claims:

I claim:

1. A baby wipe warmer apparatus operable to receive and enclose a baby wipe box for heating baby wipes before selective dispensing therefrom, comprising:
   a) a wipe container assembly to enclose the baby wipe box and having a container heater assembly mounted therein;
   b) said container heater assembly having heating means on all sides of the baby wipe box for efficient, thorough heating of the baby wipes contained therein;
   c) said wipe container assembly includes a container body member having a container lid member pivotally connected thereto;
   d) said container lid member having an outer peripheral anchor portion operable to selectively engage adjacent upper portions of a side wall of said container body member to prevent heat loss therefrom; and
   e) said peripheral anchor portion having a connector member to anchor said container lid member to said container body member in a sealing heat retaining energy efficient manner.

2. A baby wipe warmer apparatus as described in claim 1, wherein:
   a) said container heater assembly includes heater coil elements mounted in all areas of said wipe container assembly, being a container body member and a container lid member pivotally connected to said container body member to provide a complete heated enclosure for the baby wipe box.

3. A baby wipe warmer apparatus as described in claim 1, wherein:
   a) said container lid member having a dispenser opening to selectively move baby wipes therethrough and a portion of said container heater assembly mounted in said container lid member to heat adjacent baby wipes.

4. A baby wipe warmer apparatus as described in claim 1, wherein:
   a) said container body member having another portion of said container heater assembly mounted in a bottom wall and integral side walls; and
   b) said container lid member having a central dispenser opening used to selectively dispense heated baby wipes therefrom.

5. A baby wipe warmer apparatus as described in claim 4, wherein:
   a) said container heater assembly includes heater coil elements mounted within said bottom wall, said side wall, and said container lid member to provide heat on all sides of the baby wipe container.

6. A baby wipe warmer apparatus as described in claim 5, wherein:
   a) said container heater assembly includes a thermostat member connected through a power supply member and said thermostat member to said heater coil elements; and
   b) said thermostat member is selectively operable to set a predetermined temperature to be maintained within said container body member to automatically heat the baby wipes to a constant pre-selected temperature.

7. A baby wipe warmer apparatus as described in claim 1, wherein:
   a) said container lid member having a peripheral anchor section connected to an upper edge of a side wall of said container body member through a connector member which can be zipper member or Velcro fasteners and having a central dispenser opening to be selectively held in a closed condition as by a Velcro fastener to permit a single dispensing of the moisturized heated baby wipes therefrom.

8. A baby wipe warmer apparatus operable to receive and enclose a baby wipe box for heating baby wipes before selective dispensing therefrom, comprising:
   a) a wipe container assembly to enclose the baby wipe box and having a container heater assembly mounted therein;
   b) said container heater assembly having heating means on all sides of the baby wipe box for efficient, thorough heating of the baby wipes contained therein;
   c) said wipe container assembly includes a container body member having a container lid member pivotally connected thereto;
   d) said container lid member having an outer peripheral anchor portion operable to selectively engage adjacent upper portions of a side wall of said container body member to prevent heat loss therefrom; and
   e) said peripheral anchor section having an elastic portion to fit in a biased manner about said upper portion of said side wall and having a connector member to anchor said container lid member to said container body member in a sealing heat retaining energy efficient manner.

9. A baby wipe warmer apparatus as described in claim 8, wherein:
   a) said connector member is a zipper member extended about said upper portions of said side wall and said main lid body to provide a secure sealed connection therebetween.

10. A baby wipe warmer apparatus as described in claim 8, wherein:
   a) said connector member being Velcro fasteners to provide a sealing engagement between said container lid member and said container body member.

11. A baby wipe warmer apparatus operable to receive, enclose, and heat a baby wipe container having moisturized baby wipes therein, comprising:
   a) a container assembly having a container heater assembly connected thereto;
   b) said container assembly includes a container body member with a container lid member releasably mounted on said container body member; and
   c) said container lid member having a dispenser opening to selectively move baby wipes therethrough and a portion of said container heater assembly mounted in said container lid member to heat adjacent baby wipes.

12. A baby wipe warmer apparatus as described in claim 11, wherein:
   a) said container body member having another portion of said container heater assembly mounted in a bottom wall and integral side walls; and
   b) said container lid member having a central dispenser opening used to selectively dispense heated baby wipes therefrom.

13. A baby wipe warmer apparatus as described in claim 12, wherein:
   a) said container heater assembly includes heater coil elements mounted within said bottom wall, said side wall, and said container lid member to provide heat on all sides of the baby wipe container.

14. A baby wipe warmer apparatus as described in claim 13, wherein:
   a) said container heater assembly includes a thermostat member connected through a power supply member and said thermostat member to said heater coil elements; and
   b) said thermostat member is selectively operable to set a predetermined temperature to be maintained within said container body member to automatically heat the baby wipes to a constant pre-selected temperature.

15. A baby wipe warmer apparatus as described in claim 11, wherein:
   a) said container lid member having a peripheral anchor section connected to an upper edge of a side wall of said container body member through a connector member which can be a zipper member or Velcro fasteners and having a central dispenser opening to be selectively held in a closed condition as by a Velcro fastener to permit a single dispensing of the moisturized heated baby wipes therefrom.

* * * * *